(12) United States Patent
Kodialam et al.

(10) Patent No.: US 7,688,180 B2
(45) Date of Patent: Mar. 30, 2010

(54) ESTIMATION OF THE CARDINALITY OF A SET OF WIRELESS DEVICES

(75) Inventors: Muralidharan S. Kodialam, Marlboro, NJ (US); Thyagarajan Nandagopal, Edison, NJ (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 812 days.

(21) Appl. No.: 11/525,339

(22) Filed: Sep. 22, 2006

(65) Prior Publication Data

US 2008/0079544 A1 Apr. 3, 2008

(51) Int. Cl.
*H04Q 5/22* (2006.01)

(52) U.S. Cl. .................................. 340/10.1; 340/10.2

(58) Field of Classification Search ................ None
See application file for complete search history.

(56) References Cited

U.S. PATENT DOCUMENTS

| | | | | |
|---|---|---|---|---|
| 4,398,289 | A * | 8/1983 | Schoute | 370/348 |
| 5,506,848 | A * | 4/1996 | Drakopoulos et al. | 370/336 |
| 6,418,436 | B1 * | 7/2002 | Degen et al. | 707/6 |
| 6,563,417 | B1 * | 5/2003 | Shaw | 340/10.1 |
| 6,859,801 | B1 | 2/2005 | Law et al. | 707/3 |
| 7,035,818 | B1 | 4/2006 | Bandy et al. | 705/28 |
| 7,095,754 | B2 * | 8/2006 | Benveniste | 370/465 |
| 7,103,470 | B2 * | 9/2006 | Mintz | 701/117 |
| 7,486,172 | B2 * | 2/2009 | Martinez et al. | 340/10.2 |
| 2002/0118661 | A1 * | 8/2002 | Voce | 370/337 |
| 2002/0154653 | A1 | 10/2002 | Benveniste | 370/447 |
| 2003/0214389 | A1 | 11/2003 | Arneson et al. | 340/10.1 |
| 2004/0046642 | A1 | 3/2004 | Becker et al. | 340/10.32 |
| 2005/0035849 | A1 | 2/2005 | Yizhack | 340/5.92 |
| 2006/0208860 | A1 * | 9/2006 | Park et al. | 340/10.2 |
| 2007/0070896 | A1 * | 3/2007 | Alapuranen et al. | 370/230 |
| 2007/0096877 | A1 * | 5/2007 | Quan et al. | 340/10.2 |
| 2007/0126555 | A1 * | 6/2007 | Bandy | 340/10.2 |
| 2007/0286227 | A1 * | 12/2007 | Koezuka | 370/445 |
| 2008/0150692 | A1 * | 6/2008 | Missimer et al. | 340/10.1 |
| 2009/0179738 | A1 * | 7/2009 | Kageyama | 340/10.1 |

* cited by examiner

*Primary Examiner*—Daniel Wu
*Assistant Examiner*—Brian Wilson
(74) *Attorney, Agent, or Firm*—Mendelsohn Associates, P.C.

(57) ABSTRACT

In one embodiment, a method for estimating the cardinality of one or more tags in a system that has the one or more tags and one or more readers. The reader issues a command requesting that the tags identify themselves. The command includes timing information defining a total number of timeslots. In response to the command, each of the one or more tags (i) selects a timeslot in which to reply to the command and (ii) issues a reply in the selected timeslot. The method includes: (a) issuing the command; (b) receiving, in one or more timeslots, replies from the one or more tags; and (c) deriving an estimate of the cardinality of the one or more tags in the system based on at least one of: (i) the number of zero slots, wherein a zero slot is a timeslot that has no tags transmitting therein, (ii) the number of singleton slots, wherein a singleton slot is a timeslot that has only one tag transmitting therein, and (iii) the number of collision slots, wherein a collision slot is a timeslot that has more than one tag transmitting therein.

23 Claims, 8 Drawing Sheets

---

INPUT
1. Upper bound $\bar{t}$ on the number of tags $t$
2. Confidence Interval Width $\beta$
3. Error probability $\alpha$

ESTIMATION PROCEDURE

1. Compute the desired variance, $\sigma^2 = \frac{\bar{t}^2}{\beta^2}$
2. Compute the initial frame size $f$ by solving $fe^{-(\bar{t}/f)} = 5$.
3. Energize the tags and get $n_0$ and $n_c$.
4. Compute $t_0$ as in Table 1 and the variance of this estimate $\delta_0$ using Equation 1.
5. Compute $t_c$ as in Table 1 and the variance of this estimate $\delta_c$ using Equation 2.
6. If $\delta_0 < \delta_c$ then set $\hat{t} \leftarrow t_0$ else $\hat{t} \leftarrow t_c$.
7. Compute the frame size $f_{ZE}$ needed for ZE by solving for $\rho$ in
$$\hat{t} \frac{(e^\rho - (1+\rho))}{\rho} = \sigma^2$$
and setting $f_{ZE} = \hat{t}/\rho$ and set the number of repetitions $m = 1$.
8. If $f_{ZE} > f_{max}$ then set $f_{ZE} > f_{max}$. Now set $\rho = \hat{t}/f_{max}$ in Equation 1 and obtain the variance $\tilde{\sigma}^2$. The number of repetitions needed is $m = \tilde{\sigma}^2/\sigma^2$.
9. Therefore the total number of slots for ZE denoted by $T_{ZE}$ including the frame overhead is $m$ ($T + f_{ZE}$).
10. Let $f_{CE} = 1.15 * \hat{t}$. If $f_{CE} > f_{max}$ then set $f_{CE} > f_{max}$.
11. Set $\rho = \hat{t}/f_{max}$ in Equation 2 and obtain the variance $\tilde{\sigma}^2$. The number of repetitions needed is $\tilde{\sigma}^2/\sigma^2$.
12. Therefore the total number of slots for CE denoted by $T_{CE}$ including the frame overhead is $m$ ($T + f_{ZE}$).
13. If $T_{ZE} < T_{CE}$, then we use ZE else we use CE and use the appropriate number of repetitions and average the estimate over all the repetitions.

INPUT
1. Upper bound $\hat{t}$ on the number of tags $t$
2. Confidence Interval Width $\beta$
3. Error probability $\alpha$

ESTIMATION PROCEDURE

1. Compute the desired variance, $\sigma^2 = \frac{z_\alpha^2}{\beta^2}$
2. Compute the initial frame size $f$ by solving $fe^{-(\hat{t}/f)} = 5$.
3. Energize the tags and get $n_0$ and $n_c$.
4. Compute $t_0$ as in Table 1 and the variance of this estimate $\delta_0$ using Equation 1.
5. Compute $t_c$ as in Table 1 and the variance of this estimate $\delta_c$ using Equation 2.
6. If $\delta_0 < \delta_c$ then set $\hat{t} \leftarrow t_0$ else $\hat{t} \leftarrow t_c$.
7. Compute the frame size $f_{ZE}$ needed for ZE by solving for $\rho$ in $$\hat{t} \frac{(e^\rho - (1+\rho))}{\rho} = \sigma^2$$

and setting $f_{ZE} = \hat{t}/\rho$ and set the number of repetitions $m = 1$.

8. If $f_{ZE} > f_{max}$ then set $f_{ZE} > f_{max}$. Now set $\rho = \hat{t}/f_{max}$ in Equation 1 and obtain the variance $\hat{\sigma}^2$. The number of repetitions needed is $m = \hat{\sigma}^2/\sigma^2$.
9. Therefore the total number of slots for ZE denoted by $T_{ZE}$ including the frame overhead is $m$ $(T + f_{ZE})$.
10. Let $f_{CE} = 1.15 * \hat{t}$. If $f_{CE} > f_{max}$ then set $f_{CE} > f_{max}$.
11. Set $\rho = \hat{t}/f_{max}$ in Equation 2 and obtain the variance $\hat{\sigma}^2$. The number of repetitions needed is $\hat{\sigma}^2/\sigma^2$.
12. Therefore the total number of slots for CE denoted by $T_{CE}$ including the frame overhead is $m$ $(T + f_{ZE})$.
13. If $T_{ZE} < T_{CE}$, then we use ZE else we use CE and use the appropriate number of repetitions and average the estimate over all the repetitions.

FIG. 7

INPUT
Frame Size $f$, confidence Interval Width $\beta$ and error probability $\alpha$
OUTPUT
An estimator $\hat{t}$ for $t$ that satisfies the accuracy requirement.
INITIALIZATION Set $p=1, n_c = 0$.
While $n_c =0$ do
    Read Tags $(f,p)$
    If $p=1$ and $n_0 > 0$ get $t_0$
        If $t_0 < f$ then
            $e_1 = t_0, v_1 = \delta_0, \hat{t} = e_1$ and $\hat{v} = v_1$
            PROCEDURE ZERO ESTIMATE
        Else
            $e_1 = t_c, v_1 = \delta_c, \hat{t} = e_1$ and $\hat{v} = v_1$
            PROCEDURE COLLISION ESTIMATE
    Else If $n_c = 0$, Then Set $p \leftarrow 0.1 p$
        Else set $e_1 = t_c, v_1 = \delta_c, \hat{t} = t_1$ and $\hat{v} = v_1$
        PROCEDURE COLLISION ESTIMATE
End While
PROCEDURE COLLISION ESTIMATE
While $\left( \hat{v} < \dfrac{\beta^2 \hat{t}^2}{z_\alpha^2} \right)$ do
    Set $k \leftarrow k+1$
    Let $p = \min \left\{ 1, \dfrac{2.6f}{t} \right\}$
    Read Tags $(f,p)$ and get estimate $t_c$
    Compute estimator variance $\delta_c$
    Set $e_k = t_c, v_k = \delta_c$
    Compute new estimate $\hat{t} = \left( \sum_{i=1}^{k} \dfrac{e_i}{v_i^2} \right) \Big/ \left( \sum_{i=1}^{k} \dfrac{1}{v_i} \right)$
    Compute new variance $\hat{v} = \left( \sum_{i=1}^{k} \dfrac{1}{v_i} \right)^{-1}$
End While
PROCEDURE ZERO ESTIMATE
While $\left( \hat{v} > \dfrac{\beta^2 \hat{t}^2}{z_\alpha^2} \right)$ do
    Set $k \leftarrow k+1$
    Let $p = \min \left\{ 1, \dfrac{1.5f}{t} \right\}$
    Read Tags $(f,p)$ and get estimate $t_0$
    Compute estimator variance $\delta$
    Set $e_k = t_0, v_k = \delta_0$
    Compute new estimate $\hat{t} = \left( \sum_{i=1}^{k} \dfrac{e_i}{v_i^2} \right) \Big/ \left( \sum_{i=1}^{k} \dfrac{1}{v_i} \right)$
    Compute new variance $\hat{v} = \left( \sum_{i=1}^{k} \dfrac{1}{v_i} \right)^{-1}$
End While

FIG. 11

ESTIMATION OF THE CARDINALITY OF A SET OF WIRELESS DEVICES

BACKGROUND OF THE INVENTION

1. Field of the Invention

The present invention relates to wireless devices, such as radio-frequency identification (RFID) tags, and, in particular, to methods of quickly estimating the cardinality of a set of wireless devices. i.e. the number of devices in the set.

2. Description of the Related Art

A common problem that arises in any RFID deployment is the quick estimation of the number of tags in a field, up to a desired level of accuracy. Prior work in this area has focused on the identification of tags, which takes a relatively long time and is unsuitable for many situations, especially if the tag set is dense or highly dynamic.

Radio-frequency identification (RFID) tags are being used in diverse applications in everyday scenarios, ranging from inventory control and tracking to medical-patient management, and are appearing ubiquitously in increasingly-large numbers. The key driver behind this widespread adoption is the simplicity of the tags, which enables relatively low (nearly zero) cost at high volumes. The tags themselves vary significantly in their capabilities, from "dumb" or passive tags that merely transmit a particular bit-string when probed by a reader, to "smart" or active tags that have their own CPUs, memories, and power supplies. Passive tags are designed to have a relatively long life and, hence, do not use any on-board energy sources for transmitting data. Rather, they derive the energy needed for transmission from a probe signal sent by a reader node. This probe signal can be transmitted, e.g., via magnetic coupling (called near-field), or electro-magnetic coupling (called far-field). The latter has a much larger range and is designed to read hundreds of tags at a time, while the former typically has a range of less than 1 meter and, hence, is used to read less than 1 to 5 tags at a time.

RFID tags can be generally classified into passive tags, semi-passive tags, and active tags. Active and semi-passive tags have their own power sources, typically in the form of batteries. However, semi-passive tags do not use their power source for transmission, but instead use it primarily to drive other on-board circuitry. Nearly all current RFID deployments around the world involve passive and semi-passive tags. A sensor mote (a wireless transceiver that is also a remote sensor) can be classified as being an active tag.

RFID tags are often used to label items. Hence, identifying these items is normally the main goal of such an RFID system. The general idea is as follows: the reader probes a set of tags, and the tags reply back. There are many algorithms that enable identification, which can be classified into two categories: probabilistic and deterministic. Since RFID devices are relatively simple and operate in a wireless medium, collisions will typically result whenever a reader probes a set of tags. The identification algorithms use anti-collision schemes to resolve such collisions.

In probabilistic-identification algorithms, a framed scheme dubbed an "ALOHA" scheme is used, as fully described in F. C. Schoute, "Dynamic framed length ALOHA," *IEEE Transactions on Communications*, vol. 31(4). April 1983, the disclosure of which is incorporated herein in its entirety. In an ALOHA scheme, the reader communicates the frame length, and the tags pick a particular slot in the frame in which to transmit. The reader repeats this process until all tags have transmitted at least once successfully in a slot without collisions. In semi-passive and active tag systems, the reader can acknowledge tags that have succeeded at the end of each frame. Hence, those tags can stay silent in subsequent frames, reducing the probability of collisions, thereby shortening the overall identification time. In passive tag systems, all tags will continue to transmit in every frame, which lengthens the total the it takes to identify all tags.

Deterministic identification algorithms typically use a slotted-ALOHA model, where the reader identifies the set of tags that will transmit in a given slot and tries to reduce the contending tag set in the next slot based on the result in the previous slot. These algorithms fall into the class of "tree-based" identification algorithms, with the tags classified on a binary tree based on their IDs, and the reader moving down the tree at each step to identify all nodes. Deterministic algorithms are typically faster than probabilistic schemes in terms of actual tag-response slots used. However, such algorithms suffer from large reader overhead, since the reader has to specify address ranges to isolate contending tag subsets using a probe at the beginning of each slot. The common requirement for both classes of identification algorithms is an estimate of t, the actual number of tags in the system. This estimate is used to set the optimal frame size in framed ALOHA and to guide the tree-based identification process for computing the expected number of slots needed for identification. Hence, it is important to have a quick estimate that is as accurate as possible. The estimation and identification steps could hypothetically be combined or be performed concurrently, to save time, e.g., in probabilistic-identification algorithms. However, the drawback is that the initial steps then rely on inaccurate estimates of the number of tags. Hence, the estimation process should be able to use non-identifiable information, such as a string of bits used by all tags, to compute the size of the tag set t.

Estimation of the cardinality of the tag set is also important in other problems pertaining to RFID tags. Due to privacy constraints, it might not be acceptable for readers to query the tags for their identification in certain instances. In such instances, tags could send out non-identifiable information, which could still be used to compute estimates of cardinality. Another set of problems arises when the tag set is changing so fast that identification of all tags is impossible (e.g., an airplane flying over a field of sensors while trying to obtain an estimate of the number of active sensors remaining in the field). An efficient cardinality estimation scheme should be able to work in such environments as well. It should be noted that, in these instances, using an active tag does not confer any special advantages to the estimation problem from an energy-management perspective, as opposed to using a passive tag.

SUMMARY OF THE INVENTION

Problems in the prior art are addressed in accordance with the principles of the present invention in several aspects. First, the present invention provides, in certain embodiments, an efficient and fast estimation scheme that works extremely well in a wide variety of circumstances. Second, the present invention provides, in certain embodiments, a method that enables the computation of the cardinality of a tag set in a relatively small amount of time, as compared to the time taken for identification. The present invention, in certain embodiments, also involves relatively simple algorithmic modifications to readers and associated equipment that can be used with existing RFID tags and can be implemented using available technology with relatively little incremental cost.

In particular, the present invention, in certain embodiments, proposes two estimation algorithms for a static tag set, and their properties are demonstrated herein through analysis and simulations. It is shown herein that the two estimation algorithms are complementary to one other.

The present invention, in certain embodiments, also provides a single unified estimation algorithm that permits the estimation of the cardinality of a static tag set with a desired level of accuracy, and the performance of the unified algorithm is shown herein via analysis and simulations.

The present invention, in certain embodiments, further provides, using a probabilistic framed-ALOHA model, even better estimation algorithms that can achieve the desired performance in a substantially shorter time than any known algorithm. It is also shown herein that the estimation range of this algorithm spans many orders of magnitude (e.g., from tens of tags to tens of thousands of tags).

In one embodiment, the present invention provides a method for estimating the cardinality of a set of one or more tags in a system that includes the set of one or more tags and one or more readers. The one or more readers issue a command requesting that the tags issue a reply to identify themselves. The command includes timing information defining a total number of timeslots for the reply. In response to the command, one or more of the tags (i) selects a timeslot in which to reply to the command and (ii) issues the reply in the selected timeslot. The method includes: (a) issuing the command; (b) receiving, in one or more timeslots, replies from the one or more tags; and (c) deriving an estimate of the cardinality of the set of one or more tags in the system based on at least one of: (i) the number of zero slots, wherein a zero slot is a timeslot identified as having no tags transmitting therein, (ii) the number of singleton slots, wherein a singleton slot is a timeslot identified as having only one tag transmitting therein, and (iii) the number of collision slots, wherein a collision slot is a timeslot identified as having more than one tag transmitting therein.

In another embodiment, the present invention provides an apparatus for estimating the cardinality of a set of one or more tags in a system that includes the set of one or more tags and one or more readers. The one or more readers issue a command requesting that the tags issue a reply to identify themselves. The command includes timing information defining a total number of timeslots for the reply. In response to the command, one or more of the tags (i) selects a timeslot in which to reply to the command and (ii) issues the reply in the selected timeslot. The apparatus (a) issues the command. (b) receives, in one or more timeslots, replies from the one or more tags, and (d) derives an estimate of the cardinality of the set of one or more tags in the system based on at least one of: (i) the number of zero slots, wherein a zero slot is a timeslot identified as having no tags transmitting therein, (ii) the number of singleton slots, wherein a singleton slot is a timeslot identified as having only one tag transmitting therein, and (iii) the number of collision slots, wherein a collision slot is a timeslot identified as having more than one tag transmitting therein.

In a further embodiment, the present invention provides a machine-readable medium, having encoded thereon program code. When the program code is executed by a machine, the machine implements a method for estimating the cardinality of a set of one or more tags in a system that comprises the set of one or more tags and one or more readers. The method includes: (a) issuing the command; (b) receiving, in one or more timeslots, replies from the one or more tags; and (c) deriving an estimate of the cardinality of the set of one or more tags in the system based on at least one of: (i) the number of zero slots, wherein a zero slot is a timeslot identified as having no tags transmitting therein, (ii) the number of singleton slots, wherein a singleton slot is a timeslot identified as having only one tag transmitting therein, and (iii) the number of collision slots, wherein a collision slot is a timeslot identified as having more than one tag transmitting therein.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 7 illustrates pseudo-code for a unified simple-estimation algorithm that can be derived using two estimators, in an exemplary embodiment of the present invention;

FIG. 11 illustrates pseudo-code for a unified probabilistic-estimation algorithm that can be derived using two probabilistic estimators, in an exemplary embodiment of the present invention;

DETAILED DESCRIPTION

System Model

Figure 1:
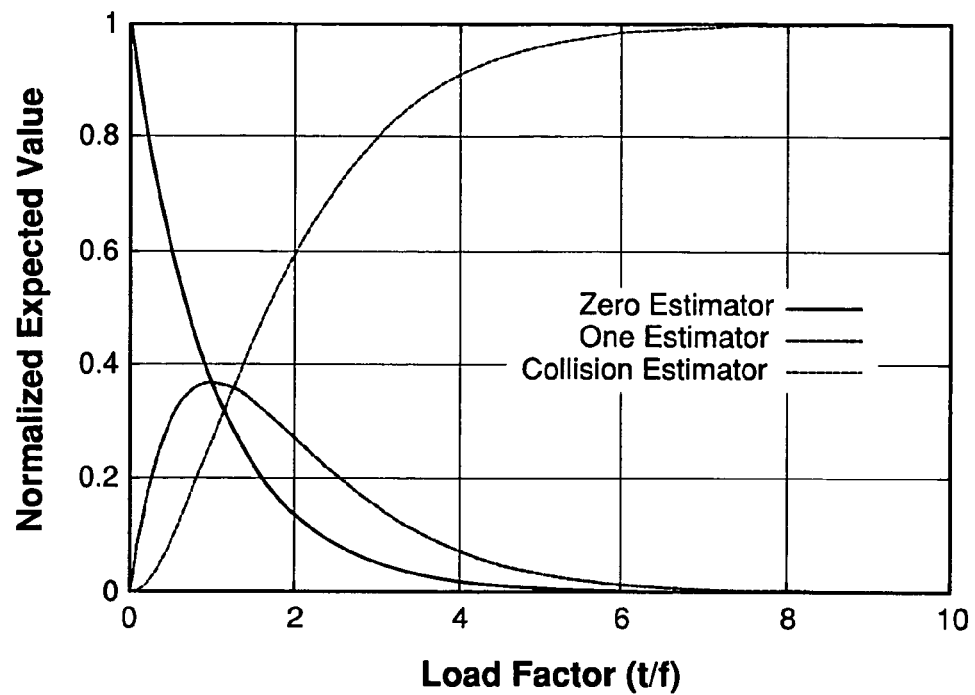
FIG. 1 illustrates a plot of normalized expected numbers of slots as functions of the load factor for each of three estimators, in an exemplary embodiment of the present invention.

In the exemplary system model used herein, an RFID system consistent with the present invention includes a set of readers and a large number of tags. Such a system adopts a "listen-before-talk" model for the RFID tags, wherein the tags listen to the reader's request before they "talk" back. It is assumed in such a scenario that there exists a separate estimation phase for computing the cardinality of the tag set, which precedes any identification process, and that the identification phase uses the framed-slotted ALOHA model for tags to transmit back to the reader (although the estimation phase could be combined with the identification phase in alternative embodiments). In this system model, given a frame of size f slots, tags randomly pick a slot based on a uniform probability distribution and transmit in that slot. Tags cannot sense the channel and, hence, merely transmit in the chosen slot. Slot synchronization is provided by the reader's request or command, which typically includes a probe to energize the tags.

When probed by the reader in the estimation phase, it is assumed in this system model that tags respond with a bit string that contains some error detection (such as CRC) embedded in the string. The length of this common bit string is defined as the minimum-length string such that the reader can detect collisions when multiple tags transmit the same string in a given slot. This string need not be unique across tags and therefore is typically much smaller than the length of the unique tag identifier. The reader can thus detect collisions in the estimation phase and identify a successful transmission in any slot by only one tag. If a time slot is not chosen by any of the tags, then the reader will recognize that this time slot is idle. The entire system, in this system model, uses a single wireless channel/band for operation.

The load factor $\rho$ of the system in this system model is defined as the ratio of the number t of tags to the number f of time slots in a frame, i.e., $\rho=t/f$. When a tag chooses to transmit, it has two degrees of freedom: (i) choosing a slot in a frame of size f and (ii) the probability p of transmission in any given frame. Current tag systems already allow variable frame sizes, albeit from a limited set of choices, for both passive and active tags. Accordingly, the reader's transmission request can contain one or both options: (i) a desired frame size f to be used by all tags, and (ii) the probability of transmission to be used by tags for transmitting in a given frame. Given both parameters, the tag first decides whether to participate in the frame with probability p and then picks a slot at random in a frame of size f. Each of these parameters can be varied across frames, resulting in four possible combinations: (i) fixed f with fixed p, (ii) fixed f with variable p, (iii) variable f with fixed p, and (iv) variable f with variable p.

In certain embodiments of the invention, the identification problem, also referred to as collision resolution or conflict resolution, will not be considered (although it should be recognized that solving the identification problem could hypothetically be combined with or performed concurrently with solving the tag cardinality estimation problem, e.g., for probabilistic-identification algorithms). The focus of the present invention, in certain embodiments as described herein, is simply to provide a reliable estimate of the cardinality of the tag set in as little time as possible.

Since the estimation scheme is probabilistic in nature, the accuracy requirement for the estimation process is specified using two parameters: the error bound $\beta>0$ and the failure probability $0<\alpha<1$.

The problem to be solved is the following: Given a set of t tags in the system, the reader has to estimate the number of tags in the system with a confidence interval of width $\beta$, i.e., the goal is to obtain an estimate $\hat{t}$ such that $$\frac{\hat{t}}{t} \in \left(1 - \frac{\beta}{2}, 1 + \frac{\beta}{2}\right),$$

with probability p greater than a. In other words, the maximum error should be at most $$\pm \frac{\beta t}{2},$$

with probability p greater than a. A sample problem would be to estimate the number of tags within ±1% of the actual number of tags with probability p greater than 99.99%.

The performance of the estimator is measured in terms of the number of slots employed to perform the estimation to the desired accuracy level. Typically, in order to achieve the specified accuracy level, multiple measurements are made. The performance is measured in terms of the total number of slots, summed over all of the measurements. The goal is to achieve the desired performance in as little time as possible. In other words, if it takes $l_e$ slots to compute $\hat{t}$, the estimate of t tags, with a certain accuracy, and $l_i$ slots to uniquely identify $\hat{t}$ tags, then $s_e l_e \ll l_i s_i$ should be true, where $s_e$ and $s_i$ are the sizes of the bit strings transmitted during the estimation and identification phases, respectively.

The variable $Z_a$ will be used herein to denote the percentile for the unit normal distribution. If a=99.9%, then $Z_a=3.2$.

A current implementation of random-slot selection in a frame, which implementation can be easily extended to accommodate the probability of transmission in a given frame, will now be described. In the Phillips I-Code system, described fully at Philips Semiconductors, "I-CODE Smart Label RFID Tags," http://www.semiconductors.com/acrobat_download/other/identification/SL092030.pdf, the disclosure of which is incorporated herein by reference in its entirety, a frame size f (typically a power of 2) is sent by a reader along with a seed value which is a 16-bit number. Each tag uses this seed information along with its identifier to hash into an integer in the range [1, f], which specifies the slot in which the frame will contend. The reader sends a different seed in each frame to ensure tags do not necessarily select the same slot in each frame. It is noted that tag/reader implementations by other RFID vendors follow similar principles for slot selection. This scheme can be extended to support variable contention probability p, as will be discussed in further detail below. The reader now sends three parameters in each probe: (i) the seed, (ii) the frame size f and (iii) the integer $$\left\lceil \frac{f}{p} \right\rceil,$$

where the notation $\lceil \ \rceil$ indicates the function "smallest integer not less than." The tag hashes the combined seed/identifier value into the range $$\left[1, \left\lceil \frac{f}{p} \right\rceil\right].$$

If the hashed value is greater than f, then the tag does not transmit in this frame, else, it transmits in the computed slot, thereby resulting in a frame transmission probability of $$\frac{f}{f/p} = p.$$

This model is implemented in the simulations described herein, except that, in the simulations described herein, the drand( ) function is used for the hashing scheme.

Based on the I-Code system, the estimator slot is set to be 10 bits long (which is actually an overestimate, since it is possible to detect collisions using even smaller bit lengths), to achieve a rate of 4000 estimation slots per second. The unique tag ID field is 56 bits long, including the CRC, and the maximum tag-identification rate in I-Code is 200 tags per second, using a 56-kbps bit-rate. Thus, the estimation slot is much smaller than the identification slot.

Simple-Estimation Algorithms

Two different estimators for t, the cardinality of the tag set, are developed herein, assuming that all tags transmit in all frames during the estimation process. The two estimators complement one another well, and combining them provides an estimation algorithm that performs well for a wide range of tag-set cardinalities.

In the exemplary system model used herein, the reader with frame size f probes the tags, and the tags pick a slot j in the frame uniformly at random and transmit in that slot. The indicator random variable $X_j$ is used for the event in which there is no transmission in slot j. In other words, $X_j=1$ if no tag transmits in slot j, and $X_j=0$ otherwise. Similarly, $Y_j=1$ if and only if there is exactly one tag that transmits in slot j, and $V_j=1$ if and only if there are multiple tags that transmit in slot j. It is noted that $X_j+Y_j+V_j=1$ for all slots j. If slot j has no transmissions in it, i.e., $X_j=1$, then this slot j will be referred to as an empty slot or a zero slot. If exactly one tag transmits in slot j, i.e., $Y_j=1$, then slot j will be referred to as a singleton slot. If multiple tags transmit in slot j, creating a collision, i.e., $V_j=1$, then slot j will be referred to as a collision slot. The total number of empty slots will be denoted by $$N_0 = \sum_{j=1}^{f} X_j,$$

the total number of singleton slots will be denoted by $$N_1 = \sum_{j=1}^{f} Y_j,$$

and the total number of collision slots will be denoted by $N_c=f-N_0-N_1$. It is noted that $N_0$, $N_1$, and $N_c$ are random variables. The values that are observed by the reader in a particular instance are represented by $n_0$, $n_1$, and $n_c$. The reader derives an estimate of t based on ($n_0$, $n_1$, $n_c$). The following Lemma 1 assists in arriving at the estimate of t.

Lemma 1. Let ($N_0$, $N_1$, $N_c$) represent the number of time slots with no transmissions, one transmission, and collision, respectively, in a system with t tags and frame size f. Let $\rho=t/f$. Then:

$E[N_0] \approx f e^{-\rho}$, $E[N_1] \approx f \rho e^{-\rho}$, and $E[N_c] \approx f(1-(1+\rho)e^{-\rho})$.

To obtain the estimators, the reader first measures ($n_0$, $n_1$, $n_c$). From Lemma 1, it is known that the expected number of empty slots is $f e^{-\rho}$, or the fraction of empty slots is $e^{-\rho}$. From the current measurement, the reader observes that the fraction of empty slots is $n_0/f$. Equating the expected value and the observed value, the reader now determines $\rho_0$ that solves $e^{-\rho_0}=n_0/f$ and sets $t_0=f\rho_0$. Similarly, the reader can obtain estimates for t from the singleton slots, as well as from the collision slots. The three exemplary estimators and estimates for t are shown in the following Table 1.

TABLE 1

| Estimator | Problem to be Solved |
|---|---|
| ZE: Zero Estimator $t_0$ | $e^{-(t_0/f)} = n_0/f$ |
| SE: Singleton Estimator $t_1$ | $(t_1/f) e^{-(t_1/f)} = n_1/f$ |
| CE: Collision Estimator $t_c$ | $1 - (1 + (t_c/f)) e^{-(t_c/f)} = n_c/f$ |

The estimator based on $t_0$ can be solved for relatively easily in closed form, but the other two estimators involve solving a non-linear equation in one variable. A simple bisection search or Newton's method can be used to solve the equation, since the estimation functions shown in Table 1 above are "well-behaved." and therefore, both of these methods converge relatively quickly. Also, when the estimate is an integer, the search can terminate once the interval of uncertainty is known to be less than one, and this fact can also be used in solving the equation. Notwithstanding other possible search methods, the bisection search method will be used herein.

The three exemplary estimators have very different characteristics. FIG. 1 illustrates a plot of the normalized expected values, $E[N_0]/f$, $E[N_1]/f$, and $E[N_c]/f$, as functions of the load factor $\rho$. It is noted that the curves for empty slots and collision slots are monotonic in $\rho$, but the curve for singleton slots is non-monotonic. Intuitively, when the load factor is very low, there are many empty slots but very few singleton or collision slots. As the load factor increases, the number of empty slots decreases with a corresponding increase in the number of singleton and collision slots. The expected number of singleton slots attains a maximum when the load factor $\rho=1$, a fact widely used in identification algorithms to optimize the number of successful identifications in a single frame. From this point on, as the load factor increases, there are many more collision slots, and the number of singleton slots decreases. Thus, when the reader solves for $\rho_1$ in $e^{-\rho_1}=n_1/f$, the solution is not unique for $\rho=1$. This suggests that it is not desirable to use the singleton slots alone for estimating the number of tags. Therefore, the following discussion will focus on the zero estimator (ZE), with an estimate denoted by $\hat{t}=t_0$, and the collision estimator (CE), with an estimate denoted by $\hat{t}=t_c$.

The operating range for the estimators will now be discussed. When the number of tags t<<f, then all slots in the frame have a high probability of encountering collisions, resulting in $n_0=n_1=0$ and $n_c=f$. In such cases, both the zero estimator and the collision estimator will not have finite estimates, i.e., $t_0=t_c=1$. Since the number of tags is assumed to be fixed, as the frame size increases (and the load factor decreases), the probability that estimators are finite will increase. In other words, given a frame size f, there is an upper bound on the number of tags that can be estimated reliably using a given estimator.

Definition 1. Given a frame size f and a probability $\theta<1$, the operating range for an estimator is defined as the maximum number t of tags for which the estimator has a finite solution with probability greater than $\theta$.

The definition of the operating range simply ensures that a finite estimate can be obtained. (It should be noted that the operating range does not speak to the accuracy of the estimate when the estimate is finite.) For a fixed f, the objective for the zero estimator (ZE) is to determine the maximum number of tags that will result in no empty slots with a probability of less than $1-\theta$, and the objective for the collision estimator (CE) is to determine the maximum number of tags that will result in collisions in all slots with a probability of less than $1-\theta$. The following classical result due to von Mises (as fully explained in Feller, *An Introduction to Probability Theory and Its Applications*, Vol. 1, John Wiley, 1968, the contents of which are incorporated herein by reference in its entirety) on the distribution of $N_0$ and $N_1$ will be used.

Lemma 2. Let t tags each pick a slot randomly from among f slots and transmit in that slot. Let t, $f \rightarrow \infty$ while maintaining $t/f=\rho$. Then, the number $N_0$ of empty slots approaches a Poisson random variable with parameter $\lambda_0 = fe^{-\rho}$ and the number $N_1$ of singleton slots is distributed approximately as a Poisson random variable with parameters $\lambda_1 = f\rho e^{-\rho}$, where $\rho = t/f$ is the load factor.

Using the above result, the probability that the reader fails to obtain a finite $t_0$ is the probability that $N_0=0$. Since $N_0$ is distributed as a Poisson variable with parameter $\lambda_0$, $$Pr[N_0=0]=e^{-\lambda_0}.$$

Hence, requiring the failure probability to be less than $(1-\theta)$ is equivalent to setting $\lambda_0 \leq -\log(1-\theta)$. If $\theta$ is set to 0.99, this corresponds to setting $\lambda_0 \leq 5$. (When $\lambda_0=5$, the failure probability is about 0.007.)

In the case of the CE estimator, the estimation process fails only if $N_c=f$, i.e., there are no empty or singleton slots. This probability is given by $$Pr[N_0=0, N_1=0] \approx e^{-\lambda_0-\lambda_1}.$$

Again using $\theta=0.99$, it can be seen that, as long as the load factor ensures that $\lambda_0+\lambda_1<5$, then the collision-based estimator fails with a probability of less than 0.007.

Figure 2:
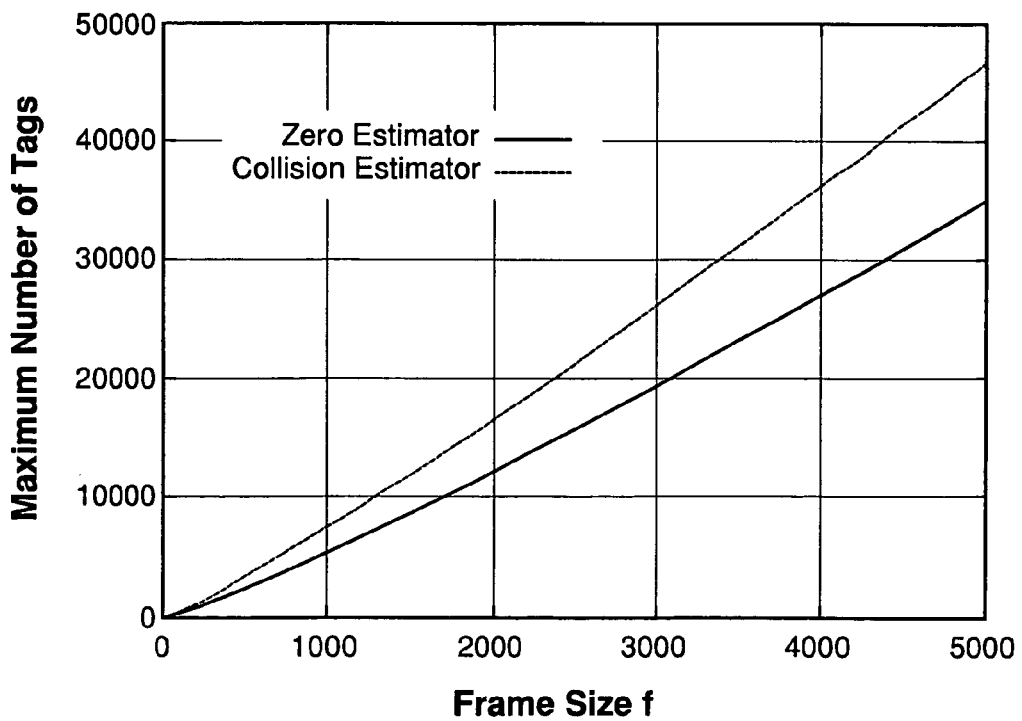
FIG. 2 illustrates a comparison of the operating ranges for two estimators, in an exemplary embodiment of the present invention.

FIG. 2 illustrates a comparison of the operating ranges for the ZE and CE estimators for $\theta=0.99$, i.e., a failure probability of less than 1%. The x-axis represents the number of slots, and the y-axis represents the maximum number of tags $t_0$ and $t_c$ that can be estimated using the ZE and CE estimators, respectively. It is noted that the range for the CE estimator is greater than the range of the ZE estimator. This difference increases with frame size. For example, the operating range for the CE estimator is about 180 higher than that of the ZE estimator for f=100 slots and is about 11600 higher when f=5000 slots. Therefore, the collision-based CE estimator can operate at higher load factors than the empty slots-based ZE estimator.

Figure 3:
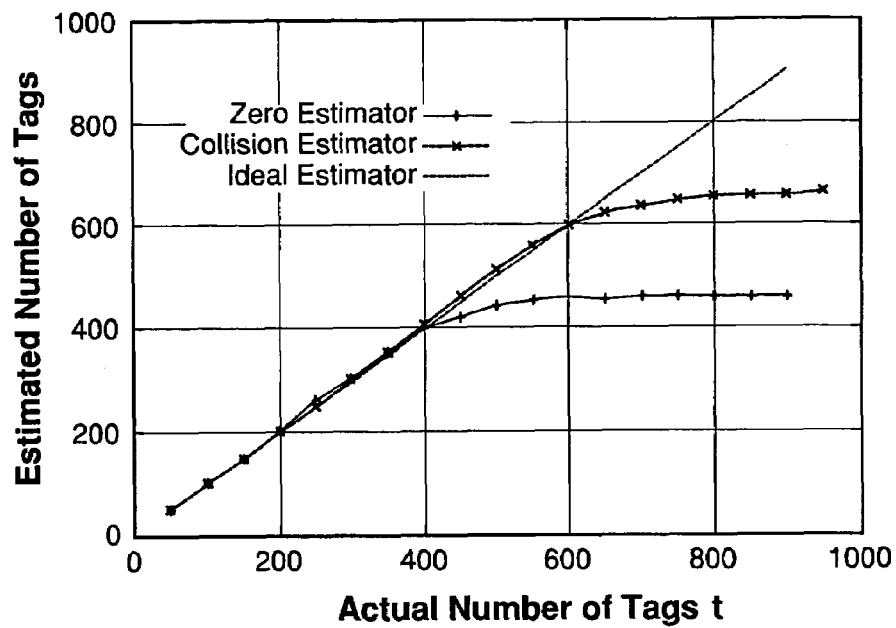
FIG. 3 illustrates the experimental performance of two estimators, in an exemplary embodiment of the present invention.

FIG. 3 illustrates the experimental performance of the CE and ZE estimators when f=100, when the number of tags is increased from 0 to 1000. The x-axis represents the actual number of tags, and the y-axis represents the estimated numbers of tags, $t_0$ and $t_c$. The ideal curve is the 45-degree line shown in the plot. Each point in the plot represents the average of 100 experiments. It is noted that the performance of $t_0$ starts deteriorating when the number t of tags is about 350, and that the performance of $t_c$ starts deteriorating when t is about 550.

From the foregoing results, it can be observed that, with increasing frame size, the operating range expands for both estimators, with a larger range for the Collision Estimator than for the Zero Estimator. This also implies that the Collision Estimator works well for a greater range of load factors than the Zero Estimator.

Determining the accuracy of the estimators will now be discussed. First, however, the variance of the CE and ZE estimators is derived. The computation of the variance not only permits comparison of the accuracy of the two estimators but also assists in deciding how to use the estimators to obtain the desired accuracy level for the estimates. In the previous discussion herein, the fact that $N_0$ and $N_1$ can be approximated as Poisson random variables was used. The reason for preferring the Poisson distribution above is that it is a discrete distribution that gives a probability mass-function value at zero for $N_0$ and $N_1$. It turns out that $N_0$ and $N_1$ can also be asymptotically approximated as normal distributions, a fact that is used for analyzing the variance of the estimators. A normal distribution with mean a and variance b is denoted by $N[a, b]$.

Theorem 1. Let each of t tags pick randomly from among f slots and transmit in the randomly-selected slot. $N_0$ represents the number of empty slots, and $N_c$ represents the number of collision slots. If f, $t \rightarrow \infty$ while maintaining $f/t=\rho$, then $$N_0 \sim N[\mu_0, \sigma_0^2],$$

where $$\mu_0 = fe^{-\rho}, \quad \sigma_0^2 = fe^{-\rho}(1-(1+\rho)e^{-\rho}),$$

and $$N_c \sim N[\mu_c, \sigma_c^2],$$

where $$\mu_c = f(1-e^{-\rho}(1+\rho)),$$

and $$\sigma_c^2 = fe^{-\rho}((1+\rho)-(1+2\rho+\rho^2+\rho^3)e^{-\rho}).$$

Figure 4:
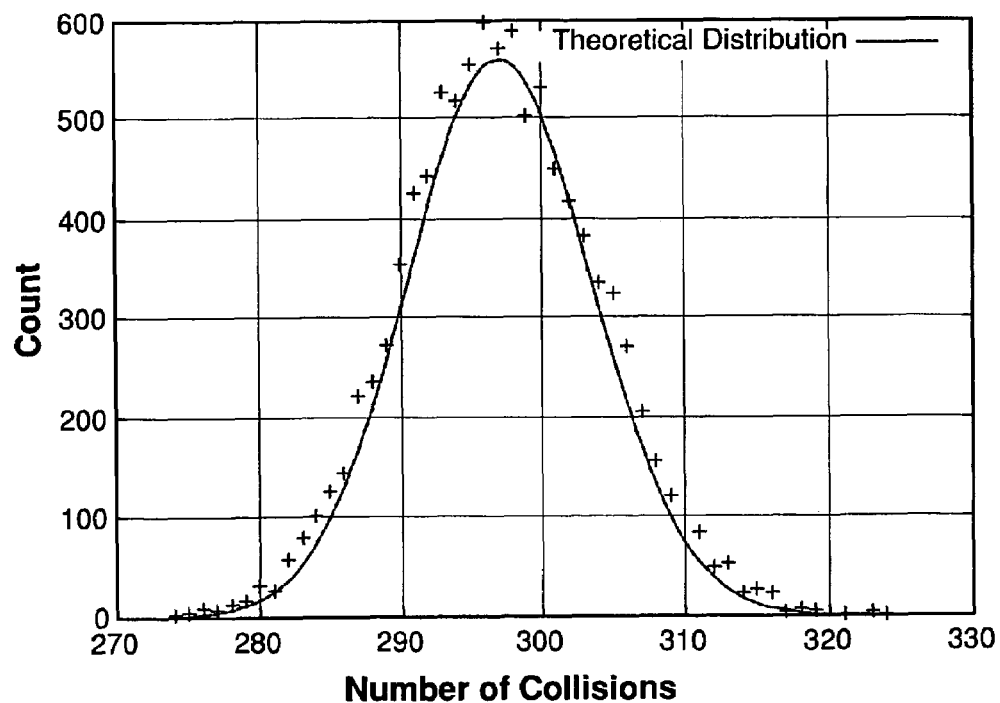
FIG. 4 illustrates the experimental distribution of the number of collision slots superimposed on the normal distribution with the mean and variance, in an exemplary embodiment of the present invention.

FIG. 4 illustrates the experimental distribution of the number of collision slots, superimposed on the normal distribution with the mean and variance, computed as in Theorem 1.

Ultimately, instances of $N_0$ and $N_c$ are measured, which are then used to estimate t. It is noted that $\mu_0$ and $\mu_c$ are viewed as (non-linear) functions of the number t of tags, i.e., as $\mu_0(t)$ and $\mu_c(t)$. From Lemma 1 and FIG. 1, it is known that both $\mu_0(t)$ and $\mu_c(t)$ are monotonic continuous functions of t, i.e., $\mu_0(t)$ is increasing in t, and $\mu_c(t)$ is decreasing in t. Since they are monotonic and continuous, both of these functions have unique inverses, denoted by $g_0(\ )$ and $g_c(\ )$, respectively. In other words, $g_0(\mu_0(t))=t$, and $g_c(\mu_c(t))=t$.

Theorem 2. Let t, $f \rightarrow \infty$ while maintaining $t/f=\rho$. Then, $$[g_0(N_0) - g_0(\mu_0(t))] \sim N[0, \delta_0], \text{ and}$$
$$[g_c(N_c) - g_c(\mu_c(t))] \sim N[0, \delta_c], \text{ where}$$

$$\delta_0 = t\frac{(e^\rho - (1+\rho))}{\rho}, \quad (1)$$

$$\delta_c = t\frac{(1+\rho)e^\rho - (1+2\rho+\rho^2+\rho^3)}{\rho^3}. \quad (2)$$

Figure 5:
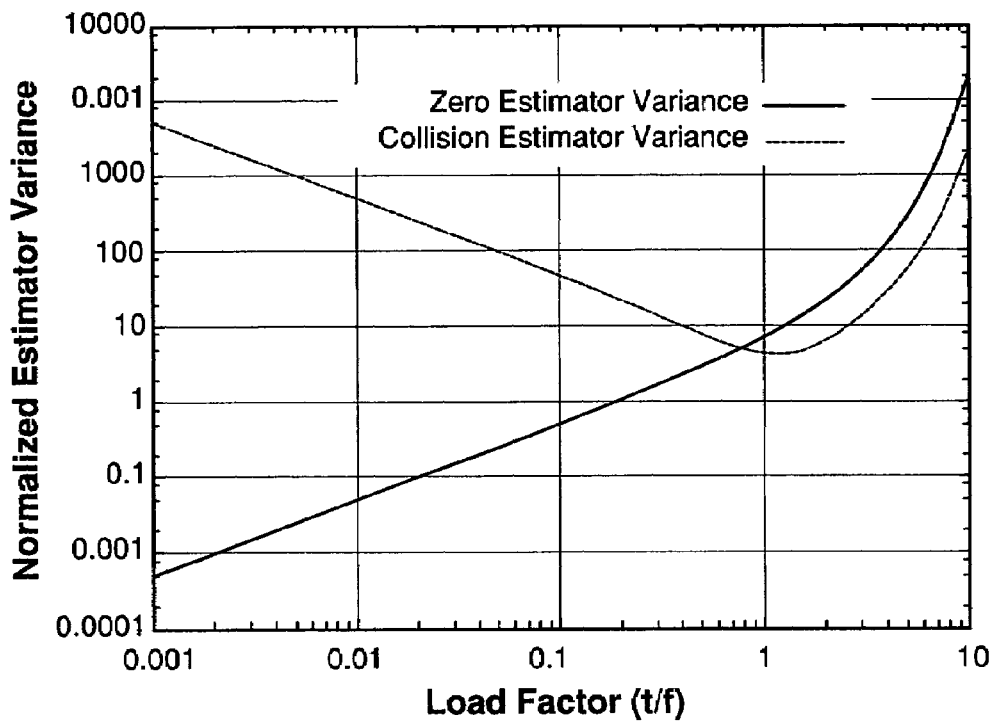
FIG. 5 illustrates a plot of the normalized estimator variance as a function of load factor, in an exemplary embodiment of the present invention.

In order to compare the variances of the two estimators, the notion of a normalized variance, which is the ratio of the estimator variance to the number of tags, is first defined. The normalized variance of the ZE estimator is $\delta_0/t$, and the normalized variance of the CE estimator is $\delta_c/t$. From the expressions for the estimator variance shown above, the normalized variance is just a function of the load factor. $\rho$. FIG. 5 illustrates a plot of the normalized estimator variance as a function of the load factor. There are three observations that can be made from FIG. 5. First, for $\rho<1$, the variance of $t_0$ decreases, while the variance of $t_c$ increases. In other words, if the number t of tags is fixed, and the number of slots is increased, the empty slots-based ZE estimator becomes more accurate, while the collision slots-based CE estimator becomes less accurate. Second, as the load factor increases, the variance of the collision-based CE estimator becomes significantly less than the variance of the empty slots-based ZE estimator. Third, the ZE estimator can achieve an arbitrarily-low normalized variance, while the normalized variance of the CE estimator is always at least 0.425. These observations suggest that, for estimating a given tag set with cardinality t, the ZE estimator can be used with a very large frame size to obtain any desired accuracy in a single frame, assuming such a frame size is allowed. On the other hand, with the CE estimator, other methods of reducing the variance are desirably investigated. It should also be recognized that the two estimators are complementary to one other. At load factors greater than a given threshold, the CE estimator performs better, while the ZE estimator performs better at lower load factors.

The reduction of the variance of the simple estimators will now be discussed. Given the expressions for the variance of the ZE and CE estimators, as provided in Equations (1) and (2) above, a straightforward way of reducing the variance of an estimator is to repeat the experiment multiple times and take the average of the estimates. If the final estimate is the average of m independent experiments, each with an estimator variance of $\sigma^2$, then the variance of the average is $\sigma^2/m$. The variance can also be manipulated by changing the frame size or performing a weighted average of the estimates. Before choosing a method for reducing the variance, the characteristics of the two estimators should first be understood.

The variance of the ZE estimator can be reduced by reducing p or, equivalently, by increasing the frame size, f. It can be shown that having a frame of size mf and performing the reading once provides a lower variance for $t_0$ than having a frame of size f and averaging the results of m experiments. If the variance is desired to be less than $\sigma^2$ for a given estimate $\hat{t}$, then $\rho$ is first solved for in the expression $$\hat{t}\frac{(e^\rho - (1+\rho))}{\rho} \leq \sigma^2,$$

and f can then be set so that $f \geq \hat{t}\rho$.

Figure 6:
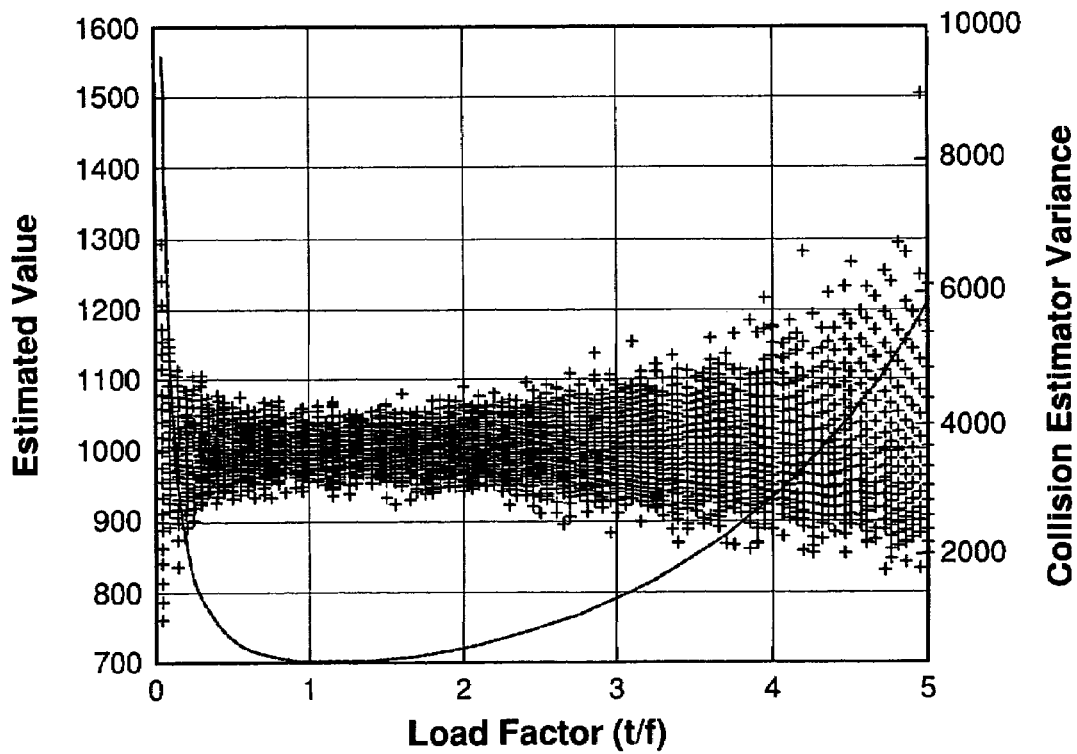
FIG. 6 illustrates a plot of the estimated variance of one estimator, in an exemplary embodiment of the present invention.

From the estimated variance plot of FIG. 6, it can be seen that $t_c$ attains minimum variance when $\rho=1.15$. This is obtained by evaluating the minima of Equation 2 with respect to $\rho$. It is noted that $\rho=1.15$ is equivalent to setting $f=(1/1.15)$ $t=0.87t$. The minimum variance when $\rho=1.15$ is $0.425 t$. If f is fixed at $f=0.87 t$, the experiment is repeated m times, m estimates are averaged, and then the variance of the final estimate is reduced by a factor of about m, i.e., the variance will be 0.87 t m. This suggests that if the final variance is desired to be less than $\sigma^2$, then the measurement should be repeated at least $\lceil 0.87t/\sigma^2 \rceil$ times.

Two other practical issues will now be addressed: maximum frame size and frame overhead. Regarding maximum frame size, the frame size that arises from the computation for a desired variance may be quite large, especially in the case of the ZE estimator. In practice, systems typically have some maximum frame-size restriction. Therefore, if the frame-size computation provided above leads to a size larger than the maximum permitted, then the maximum-permitted frame size can be used instead. This implies that multiple experiments are desirably performed in order to reduce the variance, even for the ZE estimator. The variable $f_{max}$ is used to denote the maximum frame size. Regarding frame overhead, there is typically some overhead associated with each frame, primarily the time and/or energy that is used to energize the tags. It is assumed that the frame overhead is specified in terms of the number of slots used to initialize a frame, and this quantity is denoted by the variable $\tau$. Therefore, a frame of size f actually uses up $f+\tau$ slots.

Based on the observation that the two estimators are complementary to one other, a unified simple-estimation algorithm can be derived, which uses both estimators, depending on the frame size and the estimated number of tags. For a given frame size and tag-set estimates from the two estimators, the value with the lower variance is chosen and is used to refine subsequent estimates.

Pseudo-code for one such exemplary unified algorithm is shown in FIG. 7. This algorithm receives as input (i) an upper bound $\bar{t}$ on the number t of tags, (ii) a confidence interval width $\beta$, and (iii) an error probability $\alpha$. The algorithm computes a desired variance and an initial frame size f and then energizes the tags. Next, the algorithm computes the numbers of zero slots and collision slots and the respective variances of each. The slot type (zero or collision) having the smaller variance is chosen to be used in calculating the cardinality estimate. The frame size $f_{ZE}$ needed for the zero estimator to obtain the desired variance is then computed. Next, the number of repetitions needed to obtain the desired variance is computed using equations (1) and (2), which the algorithm then uses to generate the total number of slots for the ZE estimator and the CE estimator, respectively, including frame overhead. If the total number of slots for the ZE estimator is less than the total number of slots for the CE estimator, then the ZE estimator is used, in conjunction with the appropriate number of repetitions calculated to generate multiple estimates of the cardinality of the tag set. If the total number of slots for the ZE estimator is not less than the total number of slots for the CE estimator, then the CE estimator is used, in conjunction with the appropriate number of repetitions calculated to generate multiple estimates of the cardinality of the tag set. The final value for the estimated cardinality of the tag set is the average of the multiple estimates over all of the repetitions.

Figure 8:
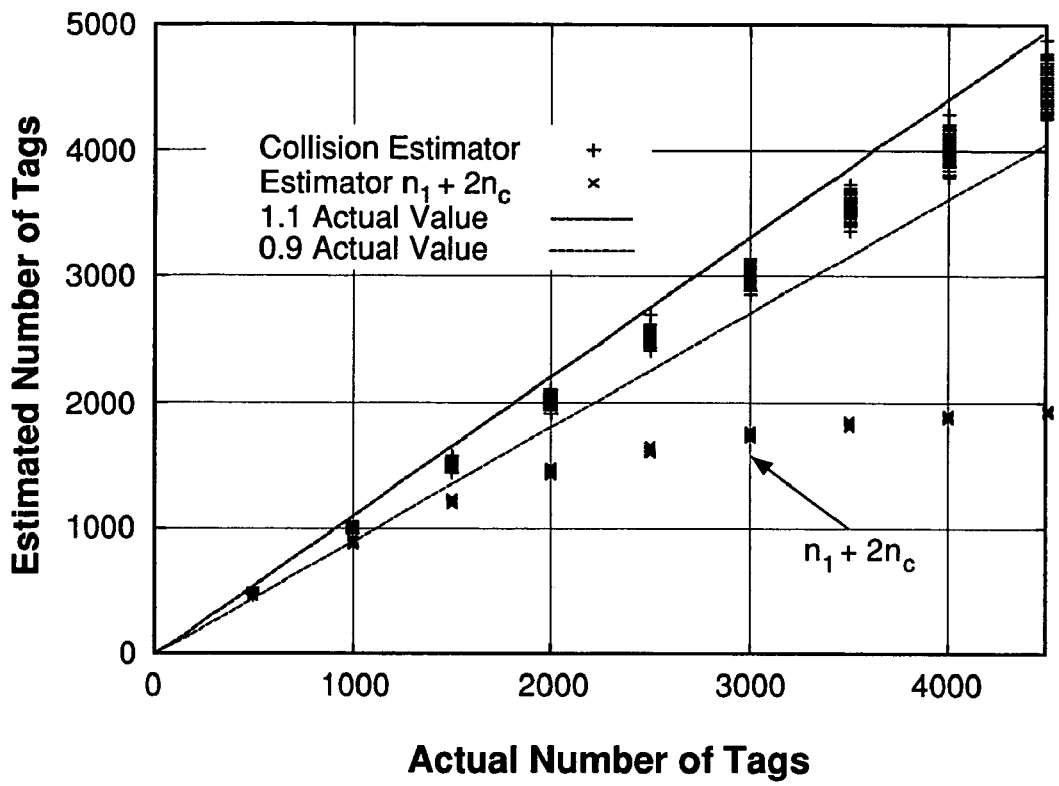
FIG. 8 illustrates a plot of various estimated values in different experimental runs over a single frame against the tag set card finality, in an exemplary embodiment of the present invention.

The simple estimators described above are capable of estimating the value of t within a 20% confidence interval ($\beta=20$) in a single frame, assuming that the frame size is initially appropriately chosen to accommodate the operating range of measurements. This is demonstrated by the experimental results in FIG. 8, in which the various estimated values in different experimental runs over a single frame are plotted against the tag-set cardinality, t. The frame size is selected to be 1000 slots. For comparison, the 20% confidence interval is also plotted, represented by the upper and lower lines with slopes 11 and 0.9, respectively. Also shown are the results of the tag-set size estimator described in Vogt, "Efficient Object Identification with Passive RFID Tags," *Lecture Notes in Computer Science*, Springer-Verlag, vol. 2414, 2002, incorporated by reference herein in its entirety, wherein a lower bound is computed as $\hat{t} \geq n_1 + 2n_c$. The estimators presented in the Vogt reference are believed to be relatively superior and to be able to provide a high confidence estimate in as few as 1000 slots.

With the proposed estimation schemes in the I-Code system discussed above, the size of a 4500-tag set can be estimated with 20% accuracy in 0.25 seconds. The amount of time to achieve the same accuracy with the identification scheme described in the I-Code reference "I-CODE Smart Label RFID Tags," is 18 seconds. Even if the system only had 500 tags, the scheme described herein can still estimate the size within ±100 in 0.25 seconds, while the identification scheme described in the I-Code reference takes 2 seconds.

Mention was made above that, with m multiple experimental estimates, averaging the estimates will reduce the variance by m. The variance can be even further reduced by weighted averaging of the estimates. This can be done, e.g., using the following statistical result.

Theorem 3. Let $e_1, e_2, \ldots, e_k$ be k estimates for t with variances $v_1, v_2, \ldots, v_k$. For any set $\{\alpha_i\}$ with $0 \leq \alpha_i \leq 1$ and $\Sigma_i \alpha_i = 1$, the expression $$\sum_{i=1}^{k} \alpha_i e_i$$

is an estimator for t having a variance of $$\sum_{i=1}^{k} \alpha_i^2 v_i.$$

The optimal choice of $\alpha_i$ that minimizes the variance of the linear combination is $$\alpha_i = \frac{\frac{1}{v_i}}{\sum_{i=1}^{k} \frac{1}{v_i}},$$

and the minimum variance is $$1 \bigg/ \sum_{i=1}^{k} \frac{1}{v_i}.$$

Weighted statistical averaging is used to compute the final variance of the sampled estimates in the simulations described herein. Using the unified simple-estimation algorithm of FIG. 7, the number of slots needed to estimate various tag sets with set sizes ranging from 5 to 50,000 is measured. In order to accommodate this large operating range, the initial frame size f as described in FIG. 7, is set to 6984 slots. It is noted that subsequent frames can be of different sizes. Simulations were used to find, for various levels of accuracy, the number of slots needed for estimation, and the results are shown in the following Table 2.

TABLE 2

| Number of tags | Slots needed for confidence interval (in %) of | | | |
|---|---|---|---|---|
| | 0.2 | 0.1 | 0.05 | 0.02 |
| 5 | 6984 | 6984 | 6984 | 6984 |
| 50 | 7028 | 7256 | 7826 | 14837 |
| 500 | 7498 | 7498 | 8666 | 15674 |
| 5000 | 12736 | 12736 | 12736 | 18558 |
| 50000 | 65378 | 65378 | 182306 | 883874 |

These results show that for tag sizes well within the operating range, the algorithm easily estimates the number of tags to within a couple of frames, with an accuracy of greater than 0.05%. However, there is very little adjustability of the algorithm for various levels of accuracy. In addition, as the desired accuracy increases, or as the number of tags reaches the upper end of the operating range, the algorithm takes a large number of slots to obtain the desired estimate, mainly due to the large frame sizes involved. However, the algorithm can advantageously obtain an estimate of 50,000 tags within a confidence interval of ±500 tags in 4.5 seconds and within ±50 tags in 16 seconds, while the time spent for identification is 100 seconds or more.

The following Table 3 shows different numbers of slots needed to achieve various operating ranges in estimating the cardinality of a set of 500 tags with a confidence interval of ±5 tags.

TABLE 3

| | Slots needed | | | | |
|---|---|---|---|---|---|
| | 500 | 1000 | 5000 | 10,000 | 50,000 |
| Operating range | 714 | 870 | 1554 | 2302 | 7498 |

The foregoing data shows that there is a tradeoff between operating range and estimation time (as a function of frame size) when the number of tags is well within the operating range.

Scalable Estimation Algorithm

Estimation schemes that allow all tags to contend in every frame have a specific operating range that is dependent on the frame size chosen, e.g., as in the unified simple-estimation algorithm of FIG. 7. Hence, in order to estimate any tag-set size t, an upper bound on the tag-set size is assumed, and the frame size is fixed, such that the operating range stretches up to the upper bound. In addition, the optimal frame sizes for computing a low-variance estimate are lower-bounded by the tag-set size t for both the ZE and the CE estimators. This requirement can be impractical in actual systems for large values of t.

In some cases, the number of tags is of orders of magnitude larger than the maximum frame size $f_{max}$, and $f_{max}$ can be very small. Extending the framed ALOHA to include probabilistic contention increases the range and improves the accuracy of estimates when the load factor is large. To this end, a new protocol termed Probabilistic-Framed ALOHA (PFA) protocol will now be described.

Definition 2. The Probabilistic-Framed ALOHA (PFA) protocol is defined as the framed-ALOHA protocol model with a frame size f and an additional contention probability p. A node in the PFA protocol decides to contend in a frame with probability p, and if it decides to contend, it picks one of the f slots in which to transmit.

It is noted that the PFA protocol is just a simple extension of probabilistic ALOHA to the framed model. When p=1 the PFA protocol becomes the Framed-ALOHA protocol. The analysis of the behavior of a probabilistic estimator in the PFA model will now be discussed. The following Theorem 4 is analogous to Theorem 1 and provides the mean and the variance for the numbers of empty slots and collision slots for the PFA scheme.

Theorem 4. Let t tags each pick randomly from among f slots and transmit in the randomly-selected slot if they choose to contend with probability p. Then, $$N_0 \sim N[\mu_0, \sigma_0^2],$$

and $$N_c \sim N[\mu_c, \sigma_c^2],$$

where $$\mu_0 = fe^{-p\rho}, \sigma_0^2 = fe^{-p\rho}(1-(1+p^2\rho)e^{-p\rho}),$$

$$\mu_c = f(1-e^{-p\rho}(1+p\rho)),$$

and $$\sigma_c^2 = fe^{-p\rho}((1+p\rho)-(1+2p\rho+p^2\rho^2+p^4\rho^3)e^{-p\rho}).$$

The estimators $t_0$ and $t_c$ for the probabilistic case are computed as shown in the following Table 4.

TABLE 4

| Estimator | Problem to be Solved |
|---|---|
| PZE: Empty Slot Estimator $t_0$ | $e^{-(pt_0/f)} = n_0/f$ |
| PCE: Collision Estimator $t_c$ | $1 - (1 + (pt_c/f)) e^{-(pt_c/f)} = n_c/f$ |

The abbreviations PZE and PCE are used to denote the estimators in the context of PFA.

The variance of the estimators will now be provided, and the derivation is similar to the framed-ALOHA derivation in Theorem 2. The estimator functions for the PFA model are $g_0(x)$ and $g_c(x)$, with $g_0(\mu_0) = g_c(\mu_c) = t$, where $\mu_0$ and $\mu_c$ are defined as in Theorem 4.

Theorem 5. Let $N_0$ and $N_c$ be the number of empty slots and number of collision slots, respectively. Then, $$[g_0(N_0) - g_0(\mu_0)] \sim N[0, \delta_0],$$

and $$[g_c(N_c) - g_c(\mu_c)] \sim N[0, \delta_c],$$

where $$\delta_0 = t\frac{(e^{p\rho} - (1 + p^2\rho))}{\rho p^2}, \text{ and}$$

$$\delta_c = t\frac{(1 + p\rho)e^{p\rho} - (1 + 2p\rho + p^2\rho^2 + p^4\rho^3)}{\rho^3 p^4}.$$

The main use of the probabilistic scheme is for handling cases in which both (i) the number of tags is large, and (ii) it is not feasible to increase the frame size to accommodate the tags. Therefore, it is temporarily assumed that the values of t and f are fixed, and that the load factor $\rho = t/f$ is relatively large.

The problem of choosing the optimal contention probability given the load factor $\rho$ will now be addressed for both the PZE and the PCE estimators. In the case of the PZE estimator, the partial derivative of $\delta_0$ with respect to p is calculated and set to zero to obtain the minimum variance. The partial derivative is given by $$\frac{\partial \delta_0}{\partial p} = \frac{t(\rho p e^{p\rho} - 2e^{p\rho} + 2))}{p^4 \rho^2} = 0.$$

In order to obtain the minimum variance, p is solved for in the following equation:

$$\rho p e^{p\rho} - 2e^{p\rho} + 2 = 0.$$

Figure 9:
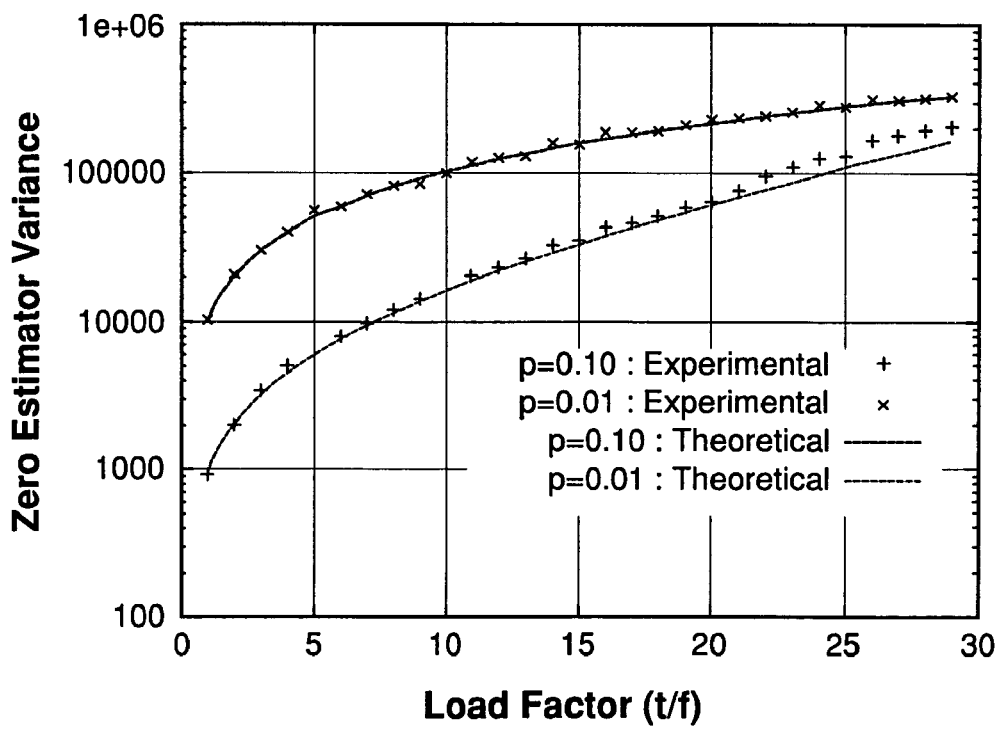
FIG. 9 illustrates a plot of a probabilistic-estimator variance, in an exemplary embodiment of the present invention.

Since $p\rho$ occurs together in the expression, it is easy to show numerically that the minimum is attained when p is chosen such that $p\rho = 1.59$. Therefore, the optimal $p = 1.59/\rho$. If $\rho < 1.59$, then the optimal value for $p = 1$. FIG. 9 is a plot of PZE estimator variance in an experimental simulation. This plot illustrates how the variance changes with p for two different values of $\rho$. In the case of the PCE estimator, the minima of the function $\delta_c(p, \rho)$ is sought with respect to p to obtain the value of p that provides minimum variance. The optimal p will satisfy $$e^{p\rho}(p^2\rho^2 - 2p\rho - 4) + 2(p^2\rho^2 + 3p\rho + 2) = 0.$$

Once again, it is noted that p and $\rho$ occur together, and therefore, it is relatively easy to solve this numerically to show that the minimum is attained when $p\rho = 2.59$. Therefore, $p = 2.59/\rho$, and $p = 1$ if $\rho < 2.59$.

Figure 10:
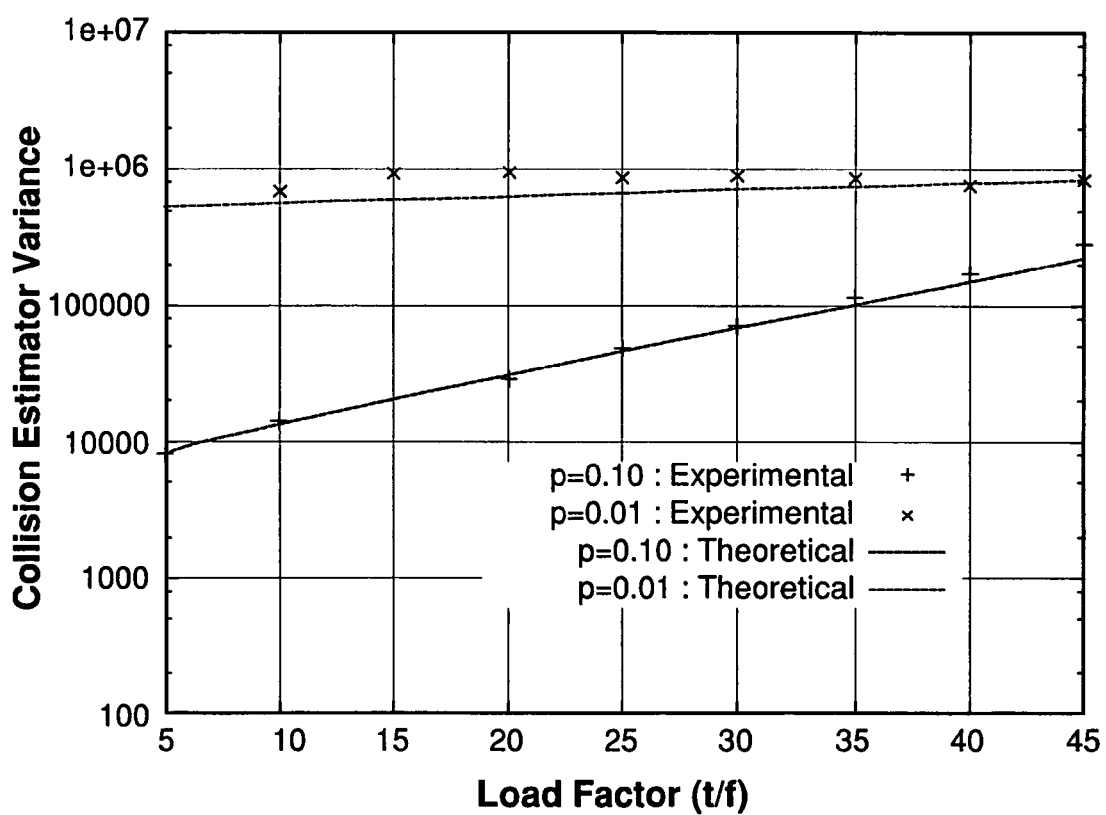
FIG. 10 illustrates a plot of another probabilistic-estimator variance, in an exemplary embodiment of the present invention.

It can also be seen that the collision-based PCE estimator is robust over a larger range than the empty slots-based PZE estimator. FIG. 10 is a plot of PCE-estimator variance in an experimental simulation. This plot illustrates how the variance changes with respect to p for two different values of $\rho$. The probabilistic-contention mechanism permits a dramatic reduction in the frame size used, even when t is large. If the variance for a single estimate is too large, then averaging multiple estimates reduces variance.

The PZE and PCE estimators are combined using the same approach as described above with respect to the ZE and CE estimators, to obtain a unified probabilistic-estimation algorithm. Pseudo-code for one such exemplary unified probabilistic-algorithm is shown in FIG. 11. This algorithm receives as input (i) a frame size f (ii) a confidence interval width $\beta$, and (iii) an error probability $\alpha$. Based on variances and cardinality estimates obtained over multiple runs of the CE and/or ZE estimators, the algorithm outputs an estimation $\hat{t}$ of the cardinality of the set of t tags that satisfies the specified accuracy requirement.

One of the advantages of the PFA protocol is that the total estimation time for given accuracy level is independent of the cardinality t of the tag set. This will now be illustrated using simulation results. As in the simulation results of the simple-estimator algorithms discussed above, the number of slots used to estimate various tag sets is measured with set sizes ranging from 5 to 50,000. Operating range is not an issue in this situation, since the probability of contention will be adapted dynamically depending on the number of tags present. The frame size is set to be a constant, f=30 slots, and the probability of contention in a frame is varied.

For various levels of accuracy, simulations were used to find the number of slots needed for estimation, and the results are shown in the following Table 5.

TABLE 5

| Number of tags | Slots needed for confidence interval (in %) of | | | |
|---|---|---|---|---|
| | 0.2 | 0.1 | 0.05 | 0.02 |
| 5 | 90 | 390 | 1440 | 8970 |
| 50 | 60 | 210 | 840 | 5190 |
| 500 | 180 | 540 | 2220 | 12420 |
| 5000 | 210 | 600 | 2220 | 13590 |
| 50000 | 240 | 660 | 2280 | 13560 |

The first observation to be made is that, for a given confidence level, the number of slots needed is nearly independent of the tag size. The second observation is that the number of estimation slots needed is of orders of magnitude smaller than those used for the unified simple-estimation algorithms (Table 2). As the accuracy requirement increases by a factor of x, the estimation time increases by a factor of $x^2$. This is expected, since the variance is related to the square of the confidence levels. It can be seen that the estimation time for a tag-set size of 50 is much better than the estimation time for a tag-set size of 5. This is because of the frame size of 30, which results in a near-optimal variance estimate for the tag-set size of 50, as compared to the tag-set size of 5. In terms of actual time, assuming a rate of 4000 estimation slots per second, any tag size (not necessarily restricted to 50,000) can be estimated with a confidence interval of 0.05 within 1 second. This is an entirely unique result as compared to prior art estimation methods.

Figure 12:
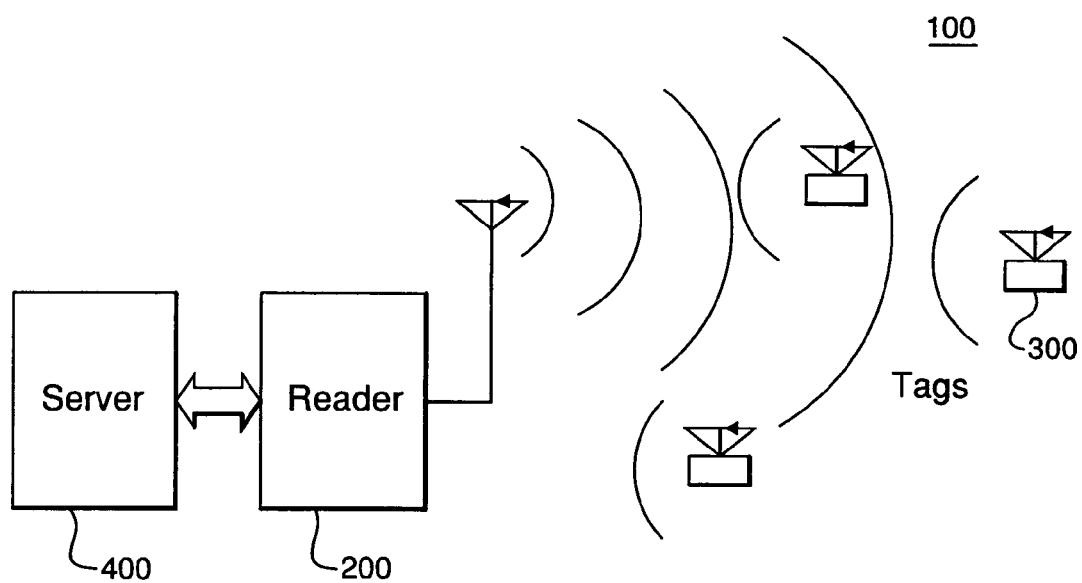
FIG. 12 illustrates an RFID system, in an exemplary embodiment of the present invention.

FIG. 12 illustrates an exemplary RFID system 100, including reader 200 and a plurality of tags 300 in selective communication with reader 200. A computer, such as server 400, is configured to perform the estimation methods based on data exchanged with the reader. While system 100 depicts an RFID system that might be used in performing one or more of the estimation methods of the present invention, as described herein, it should be understood that other systems are possible, such as those including other numbers of tags and/or readers. It should also be understood that, while a server, computer, or other processing device may be used to perform one or more of the estimation methods of the present invention, as described herein, such estimation methods may alternatively or additionally be performed by one or more of the readers themselves.

It should be understood that, while the present invention is described in terms of RFID tags and readers, the invention has utility in other applications in which estimation of the cardinality of a set of objects is performed. For example, the methods described herein could possibly have utility in estimating a cardinality of a wired or wirelessly-networked elements, such as electronic product-code (EPC) tags, nodes on a computer network, mobile telephone devices in a given range, customer loyalty cards or identification devices in a store, or even molecules, particles, biological organisms, or cells that exhibit particular responsive behaviors in a given environment. The broad terms "reader" and "tag" should be understood to include not only RFID readers and RFID tags, respectively, but also other devices performing the same or similar functions in RFID applications or in other applications, such as the exemplary applications set forth in this paragraph.

It should be recognized that the invention has applicability to both "smart" or active tags and "dumb" or passive tags, and that the expressions "probing" or "issuing a command" to a tag, as used herein, may include (i) energization of the tag and (ii) transmission of data to the tag, but does not necessarily include both of these functions, e.g., in the case of active tags that are self-powered, no energization of the tag is necessary.

The term "random" in the context of selection or number generation, as used herein, should not be construed as limited to pure random selections or number generations, but should be understood to include pseudo-random, including seed-based selections or number generations, as well as other selection or number generation methods that might simulate randomness but are not actually random, or do not even attempt to simulate randomness.

It is also possible that, in certain embodiments of the present invention, an algorithm could be used wherein certain tags are instructed not to respond to a probe at all, under certain circumstances. For example, in certain embodiments, systems employing PZE and/or PCE estimators could employ tags that are adapted not to transmit any response if the computed random number provided by the reader exceeds a given threshold value.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

We claim:

1. A method for estimating the cardinality of a set of one or more tags in a system that comprises the set of one or more tags and one or more readers, wherein:
    the one or more readers are adapted to issue a command requesting that the tags issue a reply to identify themselves, the command including timing information defining a total number of timeslots for the reply; and
    in response to the command, one or more of the tags is adapted to (i) select a timeslot in which to reply to the command and (ii) issue the reply in the selected timeslot;
the method comprising:
    (a) issuing the command;
    (b) receiving, in one or more timeslots, replies from the one or more tags; and
    (c) deriving an estimate of the cardinality of the set of one or more tags in the system, wherein the cardinality estimate is at least one of:
        (i) based on the number of zero slots, wherein a zero slot is a timeslot identified as having no tags transmitting therein, and the estimate of the cardinality of the set of one or more tags in the system in step (c) is derived by solving for the variable $t_0$ in the equation $$e^{-(t_0/f)} = n_0/f,$$

wherein f is the total number of timeslots, and $n_0$ is the number of zero slots;
        (ii) based on the number of zero slots, wherein a zero slot is a timeslot identified as having no tags transmitting therein, and the estimate of the cardinality of the set of one or more tags in the system in step (c) is derived by solving for the variable $t_0$ in the equation $$e^{-(pt_0/f)} = n_0/f,$$

wherein f is the total number of timeslots, $n_0$ is the number of zero slots, and p is the probability that a tag will select a given timeslot;
        (iii) based on the number of singleton slots, wherein a singleton slot is a timeslot identified as having only one tag transmitting therein, and the estimate of the cardinality of the set of one or more tags in the system in step (c) is derived by solving for the variable $t_1$ in the equation $$(t_1/f)e^{-(t_1/f)} = n_1/f,$$

wherein f is the total number of timeslots, and $n_1$ is the number of singleton slots;
        (iv) based on the number of collision slots, wherein a collision slot is a timeslot identified as having more than one tag transmitting therein, and the estimate of the cardinality of the set of one or more tags in the system in step (c) is derived by solving for the variable $t_c$ in the equation $$1 - (1 + (t_c/f))e^{-(t_c/f)} = n_c/f,$$

wherein f is the total number of timeslots, and $n_c$ is the number of collision slots; and
        (v) based on the number of collision slots, wherein a collision slot is a timeslot identified as having more than one tag transmitting therein, and the estimate of the cardinality of the set of one or more tags in the system in step (c) is derived by solving for the variable $t_c$ in the equation $$1 + (1 + (pt_c/f))e^{-(pt_c/f)} = n_c/f,$$

wherein f is the total number of timeslots, $n_c$ is the number of collision slots, and p is the probability that a tag will select a given timeslot.

2. The invention of claim 1, wherein the estimate of the cardinality of the set of one or more tags in the system in step (c) is derived by solving for the variable $t_0$ in the equation $$e^{-(t_0/f)} = n_0/f,$$

wherein f is the total number of timeslots, and $n_0$ is the number of zero slots.

3. The invention of claim 1, wherein the estimate of the cardinality of the set of one or more tags in the system in step (c) is derived by solving for the variable $t_0$ in the equation $$e^{-(pt_0/f)} = n_0/f,$$

wherein f is the total number of timeslots, $n_0$ is the number of zero slots, and p is the probability that a tag will select a given timeslot.

4. The invention of claim 1, wherein the estimate of the cardinality of the set of one or more tags in the system in step (c) is derived by solving for the variable $t_1$ in the equation $$(t_1/f)e^{-(t_1/f)} = n_1/f,$$

wherein f is the total number of timeslots, and $n_1$ is the number of singleton slots.

5. The invention of claim 1, wherein the estimate of the cardinality of the set of one or more tags in the system in step (c) is derived by solving for the variable $t_c$ in the equation $$1 - (1 + (t_c/f))e^{-(t_c/f)} = n_c/f,$$

wherein f is the total number of timeslots, and $n_c$ is the number of collision slots.

6. The invention of claim 1, wherein the estimate of the cardinality of the set of one or more tags in the system in step (c) is derived by solving for the variable $t_c$ in the equation $$1 - (1 + (pt_c/f))e^{-(pt_c/f)} = n_c/f,$$

wherein f is the total number of timeslots, $n_c$ is the number of collision slots, and p is the probability that a tag will select a given timeslot.

7. The invention of claim 1, wherein step (c) further comprises:

determining, based on a load factor of the system, whether to use the number of zero slots or the number of collision slots in deriving the estimate of the cardinality of the set.

8. The invention of claim 7, wherein:
the load factor is a relationship between (i) an estimated or actual number of tags in the system and (ii) the total number of time slots in the reply;
the number of collision slots is used to derive the estimate of the cardinality of the set of one or more tags in the system when the load factor exceeds a specified threshold; and
the number of zero slots is used to derive the estimate of the cardinality of the set of one or more tags in the system when the load factor does not exceed the specified threshold.

9. The invention of claim 1, wherein:
steps (a), (b), and (c) are implemented multiple times to generate multiple estimates of cardinality; and
the method further comprises deriving a variance of an estimate of the cardinality of the set of one or more tags in the system based on the multiple estimates.

10. The invention of claim 9, further comprising:
deriving a first variance by obtaining a first set of multiple estimates using the number of collision slots;
deriving a second variance by obtaining a second set of multiple estimates using the number of zero slots;
if the first variance is lower than the second variance, then obtaining one or more subsequent estimates of the cardinality of the set of one or more tags in the system using the number of collision slots; and
if the first variance is not lower than the second variance, then obtaining one or more subsequent estimates of the cardinality of the set of one or more tags in the system using the number of zero slots.

11. Apparatus for estimating the cardinality of a set of one or more tags in a system that comprises the set of one or more tags and one or more readers, wherein:
the one or more readers are adapted to issue a command requesting that the tags issue a reply to identify themselves, the command including timing information defining a total number of timeslots for the reply; and
in response to the command, one or more of the tags is adapted to (i) select a timeslot in which to reply to the command and (ii) issue the reply in the selected timeslot;
the apparatus adapted to:
(a) issue the command;
(b) receive, in one or more timeslots, replies from the one or more tags; and
(c) derive an estimate of the cardinality of the set of one or more tags in the system, wherein the cardinality estimate is at least one of:
(i) based on the number of zero slots, wherein a zero slot is a timeslot identified as having no tags transmitting therein, and the estimate of the cardinality of the set of one or more tags in the system in step (c) is derived by solving for the variable $t_0$ in the equation $$e^{-(t_0/f)} = n_0/f,$$

wherein f is the total number of timeslots, and $n_0$ is the number of zero slots;
(ii) based on the number of zero slots, wherein a zero slot is a timeslot identified as having no tags transmitting therein, and the estimate of the cardinality of the set of one or more tags in the system in step (c) is derived by solving for the variable $t_0$ in the equation $$e^{-(pt_0/f)} = n_0/f,$$

wherein f is the total number of timeslots, $n_0$ is the number of zero slots, and p is the probability that a tag will select a given timeslot;
(iii) based on the number of singleton slots, wherein a singleton slot is a timeslot identified as having only one tag transmitting therein, and the estimate of the cardinality of the set of one or more tags in the system in step (c) is derived by solving for the variable $t_1$ in the equation $$(t_1/f)e^{-(t_1/f)} = n_1/f,$$

wherein f is the total number of timeslots, and $n_1$ is the number of singleton slots;
(iv) based on the number of collision slots, wherein a collision slot is a time slot identified as having more than one tag transmitting therein, and the estimate of the cardinality of the set of one or more tags in the system in step (c) is derived by solving for the variable $t_c$ in the equation $$1 - (1 + (t_c/f))e^{-(t_c/f)} = n_c/f,$$

wherein f is the total number of timeslots, and $n_c$ is the number of collision slots; and
(v) based on the number of collision slots, wherein a collision slot is a timeslot identified as having more than one tag transmitting therein, and the estimate of the cardinality of the set of one or more tags in the system in step (c) is derived by solving for the variable $t_c$ in the equation $$1 - (1 + (pt_c/f))e^{-(pt_c/f)} = n_c/f,$$

wherein f is the total number of timeslots, $n_c$ is the number of collision slots, and p is the probability that a tag will select a given timeslot.

12. The invention of claim 11, wherein the apparatus is further adapted to determine, based on a load factor of the system, whether to use the number of zero slots or the number of collision slots in deriving the estimate of the cardinality of the set.

13. The invention of claim 11, wherein the apparatus is further adapted to:
implement steps (a), (b), and (c) multiple times to generate multiple estimates of cardinality; and
derive a variance of an estimate of the cardinality of the set of one or more tags in the system based on the multiple estimates.

14. The invention of claim 11, wherein the estimate of the cardinality of the set of one or more tags in the system in step (c) is derived by solving for the variable $t_0$ in the equation $$e^{-(t_0/f)} = n_0/f,$$

wherein f is the total number of timeslots, and $n_0$ is the number of zero slots.

15. The invention of claim 11, wherein the estimate of the cardinality of the set of one or more tags in the system in step (c) is derived by solving for the variable $t_0$ in the equation $$e^{-(pt_0/f)} = n_0/f,$$

wherein f is the total number of timeslots, $n_0$ is the number of zero slots, and p is the probability that a tag will select a given timeslot.

16. The invention of claim 11, wherein the estimate of the cardinality of the set of one or more tags in the system in step (c) is derived by solving for the variable $t_1$ in the equation $$(t_1/f)e^{-(t_1/f)} = n_1/f,$$

wherein f is the total number of timeslots, and $n_1$ is the number of singleton slots.

17. The invention of claim 11, wherein the estimate of the cardinality of the set of one or more tags in the system in step (c) is derived by solving for the variable $t_c$ in the equation $$1-(1+(t_c/f))e^{-(t_c/f)}=n_c/f,$$

wherein f is the total number of timeslots, and $n_c$ is the number of collision slots.

18. The invention of claim 11, wherein the estimate of the cardinality of the set of one or more tags in the system in step (c) is derived by solving for the variable $t_c$ in the equation $$1-(1+(pt_c/f))e^{-(pt_c/f)}=n_c/f,$$

wherein f is the total number of timeslots, $n_c$ is the number of collision slots, and p is the probability that a tag will select a given timeslot.

19. A machine-readable storage medium, having encoded thereon program code, wherein, when the program code is executed by a machine, the machine implements a method for estimating the cardinality of a set of one or more tags in a system that comprises the set of one or more tags and one or more readers, wherein:

the one or more readers are adapted to issue a command requesting that the tags issue a reply to identify themselves, the command including timing information defining a total number of timeslots for the reply; and in response to the command, one or more of the tags is adapted to (i) select a timeslot in which to reply to the command and (ii) issue the reply in the selected timeslot;

the method comprising:

(a) issuing the command;

(b) receiving, in one or more timeslots, replies from the one or more tags; and (c) deriving an estimate of the cardinality of the set of one or more tags in the system wherein the cardinality estimate is at least one of:

(i) based on the number of zero slots, wherein a zero slot is a timeslot identified as having no tags transmitting therein, and the estimate of the cardinality of the set of one or more tags in the system in step (c) is derived by solving for the variable $t_0$ in the equation $$e^{-(t_0/f)}=n_0/f,$$

wherein f is the total number of timeslots, and $n_0$ is the number of zero slots;

(ii) based on the number of zero slots, wherein a zero slot is a timeslot identified as having no tags transmitting therein, and the estimate of the cardinality of the set of one or more tags in the system in step (c) is derived by solving for the variable $t_0$ in the equation $$e^{-(pt_0/f)}=n_0/f,$$

wherein f is the total number of timeslots, $n_0$ is the number of zero slots, and p is the probability that a tag will select a given timeslot;

(iii) based on the number of singleton slots, wherein a singleton slot is a timeslot identified as having only one tag transmitting therein, and the estimate of the cardinality of the set of one or more tags in the system in step (c) is derived by solving for the variable $t_1$ in the equation $$(t_1/f)e^{-(t_1/f)}=n_1/f,$$

wherein f is the total number of timeslots, and $n_1$ is the number of singleton slots;

(iv) based on the number of collision slots, wherein a collision slot is a time slot identified as having more than one tag transmitting therein, and the estimate of the cardinality of the set of one or more tags in the system in step (c) is derived by solving for the variable $t_c$ in the equation $$1-(1+(t_c/f))e^{-(t_c/f)}=n_c/f,$$

wherein f is the total number of timeslots, and $n_c$ is the number of collision slots; and (v) based on the number of collision slots, wherein a collision slot is a timeslot identified as having more than one tag transmitting therein, and the estimate of the cardinality of the set of one or more tags in the system in step (c) is derived by solving for the variable $t_c$ in the equation $$1-(1+(pt_c/f))e^{-(pt_c/f)}=n_c/f,$$

wherein f is the total number of timeslots, $n_c$ is the number of collision slots, and p is the probability that a tag will select a given timeslot.

20. The invention of claim 19, wherein step (c) further comprises:

determining, based on a load factor of the system, whether to use the number of zero slots or the number of collision slots in deriving the estimate of the cardinality of the set.

21. The invention of claim 19, wherein:

steps (a), (b), and (c) are implemented multiple times to generate multiple estimates of cardinality; and the method further comprises deriving a variance of an estimate of the cardinality of the set of one or more tags in the system based on the multiple estimates.

22. A method for estimating the cardinality of a set of one or more tags in a system that comprises the set of one or more tags and one or more readers, wherein:

the one or more readers are adapted to issue a command requesting that the tags issue a reply to identify themselves, the command including timing information defining a total number of timeslots for the reply; and in response to the command, one or more of the tags is adapted to (i) select a timeslot in which to reply to the command and (ii) issue the reply in the selected timeslot;

the method comprising:

(a) issuing the command;

(b) receiving, in one or more timeslots, replies from the one or more tags; and (c) deriving an estimate of the cardinality of the set of one or more tags in the system based on at least one of:

(i) the number of zero slots, wherein a zero slot is a timeslot identified as having no tags transmitting therein, (ii) the number of singleton slots, wherein a singleton slot is a timeslot identified as having only one tag transmitting therein, and (iii) the number of collision slots, wherein a collision slot is a timeslot identified as having more than one tag transmitting therein, wherein:

steps (a), (b), and (c) are implemented multiple times to generate multiple estimates of cardinality; and the method further comprises:

(d) deriving variances of an estimate of the cardinality of the set of one or more tags in the system based on the multiple estimates, wherein step (d) further comprises:

(d1) deriving a first variance by obtaining a first set of multiple estimates using the number of collision slots;

(d2) deriving a second variance by obtaining a second set of multiple estimates using the number of zero slots;

(d3) if the first variance is lower than the second variance, then obtaining one or more subsequent estimates of the cardinality of the set of one or more tags in the system using the number of collision slots; and (d4) if the first variance is not lower than the second variance, then obtaining one or more subsequent estimates of the cardinality of the set of one or more tags in the system using the number of zero slots.

23. Apparatus for estimating the cardinality of a set of one or more tags in a system that comprises the set of one or more tags and one or more readers, wherein:

the one or more readers are adapted to issue a command requesting that the tags issue a reply to identify themselves, the command including timing information defining a total number of timeslots for the reply; and in response to the command, one or more of the tags is adapted to (i) select a timeslot in which to reply to the command and (ii) issue the reply in the selected timeslot;

the apparatus adapted to:

(a) issue the command;

(b) receive, in one or more timeslots, replies from the one or more tags; and (c) derive an estimate of the cardinality of the set of one or more tags in the system based on at least one of:

(i) the number of zero slots, wherein a zero slot is a timeslot identified as having no tags transmitting therein, (ii) the number of singleton slots, wherein a singleton slot is a timeslot identified as having only one tag transmitting therein, and (iii) the number of collision slots, wherein a collision slot is a timeslot identified as having more than one tag transmitting therein, wherein:

steps (a), (b), and (c) are implemented multiple times to generate multiple estimates of cardinality; and the method further comprises:

(d) deriving variances of an estimate of the cardinality of the set of one or more tags in the system based on the multiple estimates, wherein step (d) further comprises:

(d1) deriving a first variance by obtaining a first set of multiple estimates using the number of collision slots;

(d2) deriving a second variance by obtaining a second set of multiple estimates using the number of zero slots;

(d3) if the first variance is lower than the second variance, then obtaining one or more subsequent estimates of the cardinality of the set of one or more tags in the system using the number of collision slots; and (d4) if the first variance is not lower than the second variance, then obtaining one or more subsequent estimates of the cardinality of the set of one or more tags in the system using the number of zero slots.

* * * * *